(12) United States Patent
Hsiao et al.

(10) Patent No.: US 11,816,544 B2
(45) Date of Patent: *Nov. 14, 2023

(54) COMPOSITE MACHINE LEARNING SYSTEM FOR LABEL PREDICTION AND TRAINING DATA COLLECTION

(71) Applicant: INTUIT INC., Mountain View, CA (US)

(72) Inventors: Yu-Chung Hsiao, Mountain View, CA (US); Lei Pei, Mountain View, CA (US); Meng Chen, Mountain View, CA (US); Nhung Ho, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 17/232,455

(22) Filed: Apr. 16, 2021

(65) Prior Publication Data

US 2021/0232976 A1 Jul. 29, 2021

Related U.S. Application Data

(63) Continuation of application No. 15/476,647, filed on Mar. 31, 2017, now Pat. No. 10,984,340.

(51) Int. Cl.
*G06N 20/00* (2019.01)
*G06N 5/04* (2023.01)
(Continued)

(52) U.S. Cl.
CPC ............. *G06N 20/00* (2019.01); *G06N 5/04* (2013.01); *G06N 20/20* (2019.01); *G06Q 30/04* (2013.01); *G06Q 40/123* (2013.12)

(58) Field of Classification Search
CPC ........ G06N 20/00; G06N 5/04; G06Q 40/123; G06Q 30/04
See application file for complete search history.

(56) References Cited

U.S. PATENT DOCUMENTS

2002/0049738 A1* 4/2002 Epstein ................. G06F 16/951
2007/0106582 A1* 5/2007 Baker .................... G06Q 40/00
705/35

(Continued)

FOREIGN PATENT DOCUMENTS

AU 2016203592 A1 6/2016
WO 2008/021244 A2 2/2008

OTHER PUBLICATIONS

Kabbani, Reem. "Checking Eligibility of Google and Microsoft Machine Learning Tools for use by JACK e-Learning System." (Year: 2016).*

(Continued)

*Primary Examiner* — Eric Nilsson
(74) *Attorney, Agent, or Firm* — Patterson + Sheridan, LLP

(57) ABSTRACT

The present disclosure provides a composite machine learning system for a transaction labeling service. A transaction labeling service receives at least one descriptive string describing a transaction associated with a user. The service identifies a preliminary grouping from a generalized scheme. The service extracts a set of N-grams from the descriptive string and converts the N-grams and the preliminary grouping into a set of features. A machine learning model determines a label from a labeling scheme for the transaction based on the features. User input related to the label includes an accuracy indicator and a reliability indicator. If the reliability indicator satisfies a reliability condition, a set of training data for the machine learning model is (Continued)

updated based on the descriptive string and the label. The machine learning model is then trained against the updated set of training data.

20 Claims, 6 Drawing Sheets

(51) Int. Cl.
*G06Q 40/12* (2023.01)
*G06Q 30/04* (2012.01)
*G06N 20/20* (2019.01)

(56) References Cited

U.S. PATENT DOCUMENTS

| | | | | |
|---|---|---|---|---|
| 2009/0292462 A1* | 11/2009 | Babetski | ............ | G01C 21/3641 701/533 |
| 2012/0330971 A1* | 12/2012 | Thomas | ................ | G06F 16/283 707/748 |
| 2015/0254555 A1* | 9/2015 | Williams, Jr. | ......... | G06N 3/045 706/14 |
| 2017/0147934 A1 | 5/2017 | Hecht et al. | | |

OTHER PUBLICATIONS

International Search Report and Written Opinion—PCT/US2018/025247—International Searching Authority—European Patent Office—dated Sep. 13, 2018, 14 pages.

Zhang et al., "On rater reliability and agreement based dynamic active learning", 015 International Conference on Affective Computing and Intelligent Interaction (ACII), IEEE, 2015.

Siegert et al., "Inter-rater reliability for emotion annotation in human-computer interaction: comparison and methodological improvements", Journal on Multimodal User Interfaces 8.1, 2014, pp. 17-28.

\* cited by examiner

COMPOSITE MACHINE LEARNING SYSTEM FOR LABEL PREDICTION AND TRAINING DATA COLLECTION

CROSS-REFERENCE TO RELATED APPLICATIONS

This Application is a continuation of and hereby claims priority under 35 U.S.C. § 120 to co-pending U.S. patent application Ser. No. 15/476,647, filed on Mar. 31, 2017, the entire contents of which are incorporated herein by reference.

BACKGROUND

Embodiments presented herein generally relate to machine learning systems. More specifically, details are disclosed for a composite machine learning system that determines labels for transactions. Furthermore, details are disclosed for inferring whether to add the transactions and labels to a set of training data for the machine learning system based on explicit and implicit user feedback.

Machine learning models systems enable computing systems to develop improved functionality without explicitly being programmed. Given a set of training data, a machine learning model can generate and refine a function that predicts a target attribute for an instance based on other attributes of the instance. For example, if an instance represents an automobile and the target attribute is the automobile's gas mileage, a machine learning model can train itself to predict gas mileage based on the attributes such as the automobile's weight, tire size, number of cylinders, and engine displacement.

The predictive accuracy a machine learning model achieves ultimately depends on many factors, but better training data generally leads to better accuracy. Ideally, training data should be representative of the population for which predictions are desired (e.g., unbiased and correctly labeled). In addition, training data should include a large number of training instances relative to the number of attributes on which predictions are based and relative to the range of possible values for each attribute.

Some machine learning models are well suited for domains that involve numerical attributes. Other machine learning models, such as decision trees, lend themselves more readily to domains that involve categorical attributes.

SUMMARY

One embodiment of the present disclosure includes a method that generally includes receiving an electronic request to label a transaction associated with a user, wherein the electronic request includes at least one descriptive string describing the transaction; extracting a set of N-grams from the at least one descriptive string; generating a set of features for the transaction based on the set of N-grams; determining, via a machine learning model that receives the set of features as input, a label for the transaction; and providing the label in response to the electronic request.

Another embodiment provides a computer-readable storage medium having instructions, which, when executed on a processor, perform an operation that generally includes receiving an electronic request to label a transaction associated with a user, wherein the electronic request includes at least one descriptive string describing the transaction; extracting a set of N-grams from the at least one descriptive string; generating a set of features for the transaction based on the set of N-grams; determining, via a machine learning model that receives the set of features as input, a label for the transaction; and providing the label in response to the electronic request.

Still another embodiment of the present disclosure includes one or more processors and memory storing a program which, when executed on the processor, performs an operation that generally includes receiving an electronic request to label a transaction associated with a user, wherein the electronic request includes at least one descriptive string describing the transaction; extracting a set of N-grams from the at least one descriptive string; generating a set of features for the transaction based on the set of N-grams; determining, via a machine learning model that receives the set of features as input, a label for the transaction; and providing the label in response to the electronic request.

DETAILED DESCRIPTION

Embodiments presented herein provide systems and methods that incorporate one or more machine learning models, one or more associative arrays (e.g., dictionaries with key-value pairs), and optional override rules that operate together in a composite infrastructure to supply accurate and adaptable label prediction based on descriptive strings. Systems described herein can provide label prediction services to diverse groups of software applications. In one example, the label prediction services are provided through an application programming interface (API) service (though the label prediction services can also be provided through other types of computing infrastructures).

To perform well, a machine learning model typically has to be trained with properly labeled training data that includes a large number of training instances relative to the number of features on which predictions are based and relative to the range of possible values for each feature. Gathering a sufficient number training instances can take time—and verifying that the instances are correctly labeled is a task that is difficult to automate.

Using a specialized feedback loop, systems of the present disclosure identify and compile training data for the machine learning model based on explicit and implicit feedback. Explicit feedback may include, for example, an electronic confirmation from the user to verify a label, while implicit feedback may include context such as measurable aspects of user conduct (e.g., how long the user took to evaluate a label). For a transaction and an associated label, a reliability indicator is determined based on the feedback. The reliability indicator helps determine whether to add the transaction and label to a set of training data. The machine learning model is then trained against the training data to improve the accuracy of future predictions.

Figure 1:
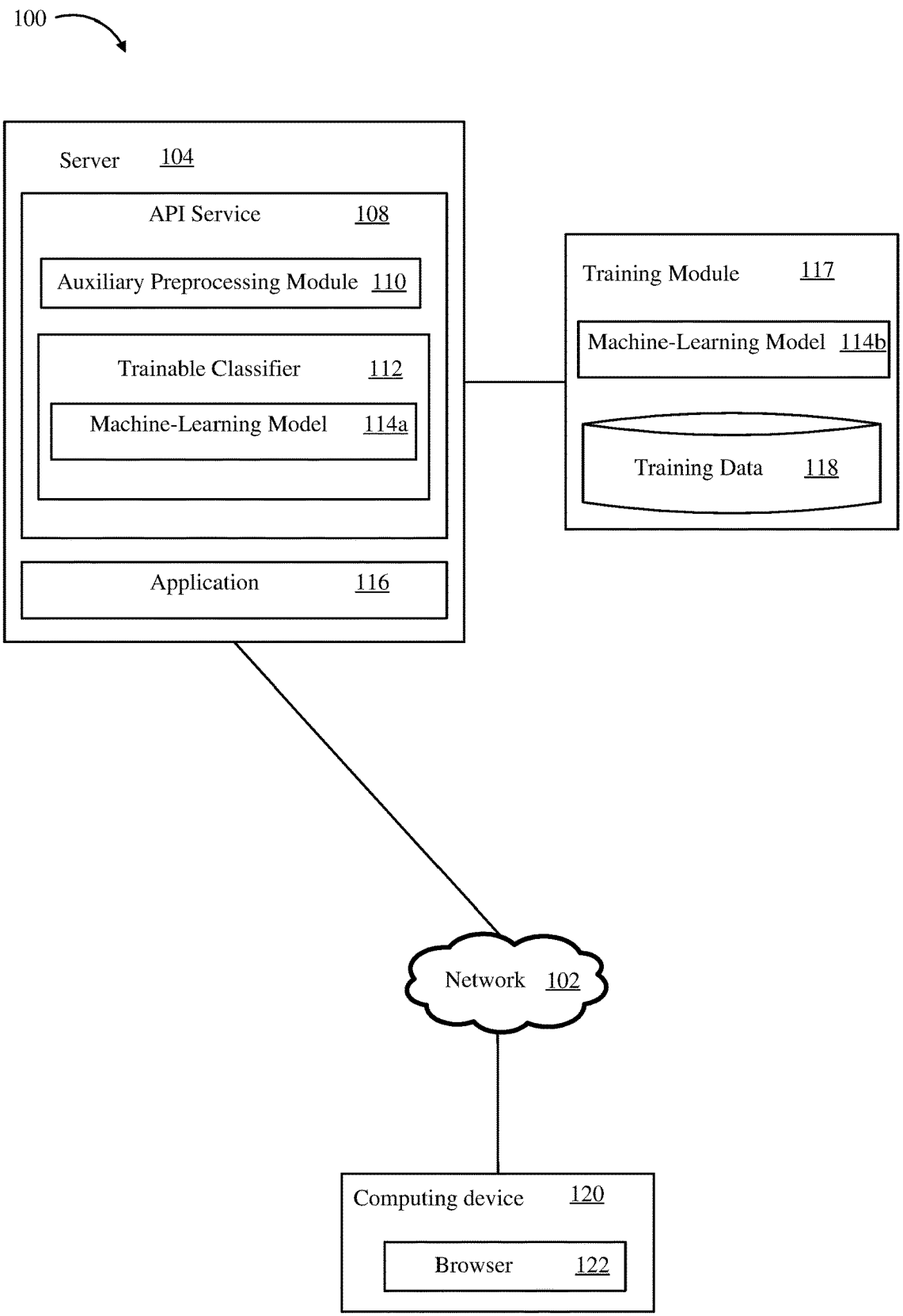
FIG. 1 illustrates a computing network environment wherein technology of the present disclosure can operate, according to one embodiment.

FIG. 1 illustrates a computing network environment 100 wherein technology of the present disclosure can operate, according to one embodiment. As shown, the computing network environment 100 includes a network 102, a computing device 120, a server 104, and a training module 117. A browser 122 executing at the computing device 120 communicates with the application 116 via the network 102. (Note that, in some embodiments, the application 116 may also be a standalone application that executes on the computing device 120 without using the browser 122 at all).

A user (e.g., a self-employed person or a company representative) of the computing device 120 can log on to the application 116 via the browser 122 and access functionality the application 116 provides. In one example, the application 116 is software that determines a tax liability for the user. The application 116 can determine the tax liability based on monetary transactions recorded in an account for the user. The transactions may represent, for example, different types of income and expenses (e.g., reflected by debits and credits to an account). To supply records of these transactions to the application 116, the user can provide logon credentials that allow the application 116 to access electronic transaction records provided by a bank where the user has an account. The application 116 can use the logon credentials to download the electronic transaction records from the bank electronically through the network 102 (e.g., via a secure website provided by the bank). Alternatively, the user can manually provide transaction records (e.g., by keying in amounts and descriptions).

Different types of transactions affect tax liability differently, so the application 116 can predict the user's tax liability more accurately if the transactions are labeled according to categories defined in tax law of a jurisdiction where the user resides (or some other jurisdiction whose tax laws apply to the user). For this reason, the application 116 accesses the Application Programming Interface (API) service 108 to determine the categories for the transactions. (Note that, in some embodiments, label prediction may be provided through another type of software service that does not use an API.) The API service 108 exposes predictive functionality of the trainable classifier 112 to the application 116. In some embodiments, the application 116 accesses the API service 108 programmatically (e.g., via function calls programmed in an application or function library) or via a web resource for web-based applications. In some examples, the application 116 can invoke functionality exposed by the API service 108 using a Representational State Transfer function call (a REST call), queries in an HTTP POST request, a Simple Object Access Protocol (SOAP) request, or other protocols that allow client software to invoke functions on a remote system.

For a given transaction, the application 116 sends an API request to the API service 108. The API request includes transaction information describing the transaction, such as at least one descriptive string, an amount of the transaction, and metadata for the transaction. As shown in FIG. 1, the API service 108 can include an optional auxiliary preprocessing module 110 that can determine one or more outputs based on the transaction information. These outputs may include the name of a merchant associated with the transaction and a preliminary grouping for the transaction. (In some cases, as described in further detail with respect to FIG. 2, these outputs may be sufficient to determine a label for the transaction.)

In one example, the auxiliary preprocessing module 110 compares at least one token in the descriptive string to a dictionary to determine if the dictionary includes a matching entry for the token. If a matching entry is found, the auxiliary preprocessing module 110 assigns a preliminary grouping specified in the matching entry to the transaction. The preliminary grouping is selected from a set of possible groupings (e.g., categories) in a generalized scheme. In this example, the generalized scheme includes groupings that are relatively broad and that do not directly reflect a tax code of any particular jurisdiction. If there is not a match in the dictionary, the auxiliary preprocessing module 110 can assign a default preliminary grouping (e.g., "Miscellaneous" or "Unclassified") to the transaction.

In one example, the auxiliary preprocessing module 110 uses one or more associative arrays (e.g., as a dictionary). Associative arrays (e.g., dictionaries that store data as a collection of key-value pairs) are one example of a construct can be used to determine a preliminary grouping based on descriptive strings. For example, suppose a descriptive string for a transaction is "XYZ INC HOUSTON TX CARD3325." Within this descriptive string is the substring "XYZ INC," a likely candidate for a merchant name. If an associative array for assigning preliminary grouping includes an entry with "XYZ INC" as the key and "veterinary services" as the value in a key-value pair, the transaction can be assigned to a preliminary grouping entitled "veterinary services." Thus, an associative array can assign a preliminary grouping via a rapid lookup operation. Associative arrays, however, generally have to include an exact match for a substring to be able to provide a useful preliminary grouping. While a default entry could specify that unmatched strings are labeled as "unclassified," such a label may not be very useful. As a result, in domains where constant change occurs, associative arrays have to be updated frequently to remain effective. For example, to assign preliminary groupings to transactions based on merchant names effectively, an associative array has to have a new entry created for each new merchant that comes into existence. Since hundreds of thousands of new companies are created in the U.S. alone each year, the amount of work needed to keep an associative array up to date is substantial. There is generally a lag period between the time a merchant comes into existence and the time the associative array is updated. During that lag period, the associative array may be of limited value for assigning preliminary groupings to transactions associated with the merchant.

The output (e.g., the preliminary grouping and a merchant name) is sent from the auxiliary preprocessing module 110 to the trainable classifier 112. In addition, the transaction information is sent to the trainable classifier 112 (e.g., directly from a user's banking institution). The trainable classifier 112 extracts a plurality of N-grams from the descriptive string (or strings, in examples where more than one descriptive string is included in the transaction information). As used herein, an N-gram refers to a contiguous sequence of N tokens found in a given sequence of text, where N is a positive integer. The trainable classifier 112 determines a set of features for the transaction based on the plurality of N-grams and the metadata. The set of features also includes the output of the auxiliary preprocessing module 110, such as the preliminary grouping. In one example, suppose the set of features comprises one feature for each possible grouping in set of possible groupings (along with other features for the N-grams, as explained in further detail below with respect to FIG. 2). If the set of possible groupings includes {groceries, entertainment, medical, service, and rent} and the preliminary grouping assigned by the auxiliary preprocessing module 110 is "entertainment," the features corresponding to the possible groupings of the generalized scheme can be {0, 1, 0, 0, 0}. Similarly, if the preliminary grouping assigned by the auxiliary preprocessing module 110 is "service," the features corresponding to the possible groupings can be {0, 0, 0, 1, 0}. In general, the feature corresponding to the assigned preliminary grouping is given the value of 1 (or some other nonzero value that serves as a weight), while the features corresponding to the other possible preliminary groupings are given the value of 0. A one-hot encoder can be used to determine the features corresponding to the preliminary grouping in this fashion. Values for features that correspond to the N-grams can be determined in a similar fashion (as explained in more detail with respect to FIG. 2) A hashing vectorizer can be used to determine the values for the features corresponding to the N-grams.

The machine learning model 114a receives the features as input and predicts a label for the transaction. The label is selected from a set of possible labels (e.g., categories) in a labeling scheme. The nature of the relationship between the labeling scheme and the generalized scheme can vary. For example, the generalized scheme may use generic groupings that are meant to inform about the type of product or service for which a transaction is made in an intuitive fashion. The labeling scheme may use labels that are more esoteric, such as labels defined in the tax law of a jurisdiction that has authority to levy taxes from the user. For example, if the United States is the jurisdiction, the labeling scheme can include the "schedule C" categories of deductible expenses defined by the Internal Revenue Service (IRS) for the 1040 tax form. Typically, if a transaction has been assigned a preliminary grouping from the generalized scheme, that preliminary grouping provides some information that may be useful for predicting a label from the labeling scheme. For this reason, the machine learning model 114a uses a feature representing the preliminary grouping as input. However, depending on the labeling schemes used, a preliminary grouping from the generalized scheme may not necessarily map to the same label from the labeling scheme for every possible transaction. In more formal terms, if preliminary grouping in the generalized scheme are considered the domain and labels in the labeling scheme are considered the range, the relation between the domain and the range may not necessarily be surjective, injective, or bijective, or may not even be a function at all. However, the relation may still be non-random in some way such that the preliminary grouping and the label for a transaction are not strictly independent (in a statistical sense) of each other. The machine learning model 114a leverages any dependence that exists between the preliminary grouping and the label to help predict the label.

The API service 108 sends an API response to the application 116 indicating the label in reply to the API request. When the API response is received, the application 116 can use the label to help perform one or more functions. For example, the application 116 may update an aggregate amount associated with the user and the label (e.g., by adding the amount of the transaction to the aggregate amount). In this example, if the aggregate amount is the sum of all deductible expenses for the user in the current calendar year and the transaction is a payment of a licensure fee for the user's profession (classified as a deductible expense under "schedule C"), the application 116 adds the amount of the licensure fee to the sum of deductible expenses.

The machine learning model 114a is a copy of the machine learning model 114b. The training module 117 trains the machine learning model 114b against the training data 118. The training data 118 includes transaction information from previous transactions and corresponding labels. Also, the training data 118 includes output from the auxiliary preprocessing module 110 (when applicable). Periodically, the training data 118 is updated (e.g., as described with respect to FIG. 2). After training the training data 118 has been updated, the training module 117 retrains the machine learning model 114b. After the retraining, machine learning model 114b is copied over to trainable classifier 112 so that machine learning model 114a stays up-to-date.

While FIG. 1 illustrates one embodiment in which certain elements are located at separate network-connected locations, one of skill in the art will recognize that some or all elements can be located in different places. For example, in a cloud-based computing environment, the API service 108, the application 116, the training module 117, the training data 118, the auxiliary preprocessing module 110, the trainable classifier 112, and the machine learning model 114a may be implemented across different hardware hosts, virtual machines, and other physical or virtual resources without departing from the spirit and scope of the disclosure.

Figure 2:
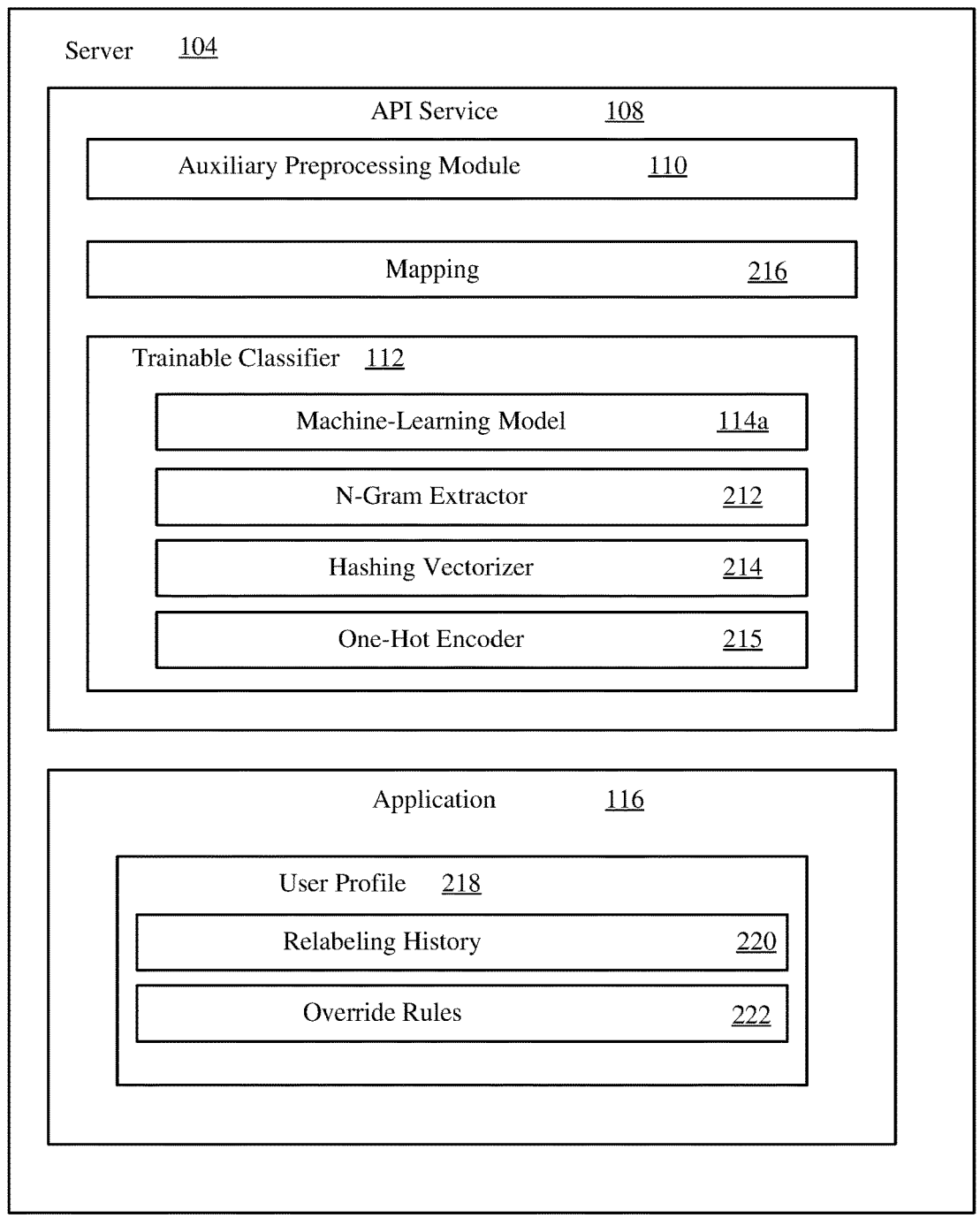
FIG. 2 illustrates a detailed view of a server wherein technology of the present disclosure can operate, according to one embodiment.

FIG. 2 illustrates a detailed view of the server 104, according to one embodiment. A user (e.g., a self-employed person or a company representative) can log on to the application 116 and access functionality the application 116 provides. In one example, the application 116 is software that determines a tax liability for the user. The application 116 can determine the tax liability based on monetary transactions recorded in an account for the user. The transactions may represent, for example, different types of income and expenses (e.g., reflected by debits, credits, or other actions taken with respect to one or more accounts). To supply records of these transactions to the application 116, the user can provide logon credentials that allow the application 116 to access electronic transaction records provided by a bank where the user has an account. The application 116 can use the logon credentials to download the electronic transaction records from the bank electronically through the network 102 (e.g., via a secure website provided by the bank). Alternatively, the user can manually provide part or all of the transaction records (e.g., by keying in amounts and descriptions).

The application 116 invokes one or more functions exposed by API service 108 to predict a label for each transaction by sending an API request. The API request includes transaction information describing the transaction, such as one or more descriptive strings, metadata, and an amount of the transaction. Once received by the API service, the transaction information is sent to the auxiliary preprocessing module 110. The auxiliary preprocessing module 110 is an optional element that can generate one or more outputs corresponding to input features for the machine learning model 114a. FIG. 2 provides one example of how the auxiliary preprocessing module 110 can operate, but other examples with varying structures and outputs are also possible.

In one example, the auxiliary preprocessing module 110 identifies token sequences in the descriptive string for lookup (e.g., in one or more dictionaries). There are a number of ways the auxiliary preprocessing module 110 can identify token sequences for lookup. For example, the auxiliary preprocessing module 110 can include predefined regular expressions designed to match token sequences that are likely to be merchant names or city names. The smallest token subsequence within the descriptive string that matches a regular expression associated with a dictionary can be used for lookup in that dictionary. Also, since lookup operations can typically be performed very rapidly, other token subsequences matching the regular expression can also be used for lookup. Other approaches can also be used. For example, for the auxiliary preprocessing module 110 can consider one or more whitespace characters to be a delimiter and select all tokens separated by whitespace for lookup.

In one example, suppose the descriptive string is "Acme Burger 5463 Main Street, Beverly Hills Calif. 90210." The auxiliary preprocessing module 110 selects the token sequence "Acme Burger" for lookup in a dictionary (e.g., by determining that "Acme Burger" is likely to be a merchant name). The auxiliary preprocessing module 110 also selects the token sequences "Acme Burger" and "Beverly Hills Calif." for lookup in the dictionary. The auxiliary preprocessing module 110 also selects the token "Burger" for lookup in the dictionary.

The selected tokens are then compared to a dictionary to determine if any matches exist. In a dictionary, a matching entry maps at least one of the tokens to a preliminary grouping from a generalized scheme. In this example, the generalized scheme does not directly reflect a tax code of any particular jurisdiction. If no matches are found, an unmatched token sequence can map to a default preliminary grouping (e.g., "Miscellaneous" or "Unclassified").

If the auxiliary preprocessing module 110 uses multiple dictionaries and all map the token sequences to the same preliminary grouping, the auxiliary preprocessing module 110 assigns that preliminary grouping to the transaction. On the other hand, if different dictionaries map the token sequences to different preliminary groupings, the auxiliary preprocessing module 110 determines which preliminary grouping to assign based on a predefined scoring methodology. The predefined scoring methodology specifies how to calculate a score for a match found in each of the dictionaries. In one embodiment, the predefined scoring methodology is based on empirical data. For example, if empirical data suggests that preliminary groupings for 77% of transactions that include a token subsequence matching a particular entry in a particular have been correctly assigned, the score for the match can be 0.77. Similarly, if empirical data suggests that preliminary groupings for 100% of transactions that include a token subsequence matching the particular entry have been correctly assigned, the score for the match can be 1.0. Thus, the score for a match can reflect how well the matching entry has assigned preliminary groupings for previous transactions.

If multiple dictionaries are used, the auxiliary preprocessing module 110 determines scores for the matches in the dictionaries and assigns the preliminary grouping given by the dictionary in which the best scoring match is found.

The auxiliary preprocessing module 110 sends the preliminary grouping and a merchant name extracted from the descriptive string to the trainable classifier 112. Also, the transaction information is sent to the trainable classifier 112. The N-gram extractor 212 extracts a plurality of N-grams from the descriptive string. The hashing vectorizer 214 converts the N-grams into features. In one example, the hashing vectorizer 214 converts each N-gram into a single corresponding feature.

To convert an N-gram to a feature, the hashing vectorizer 214 inputs the N-gram into a hash function associated with the hashing vectorizer 214. The hash function determines a hash value that serves as an index to a hash "bucket" in an array (or a comparable data structure). The bucket corresponds to a feature; the feature is set to a nonzero value. The hashing vectorizer 214 repeats this process for each N-gram. Hence, if a feature is nonzero, the hash function output the index of the corresponding bucket for at least one N-gram. Conversely, if a feature is set to 0, the hash function did not output the index of the corresponding bucket for any of the N-grams. After the N-grams have been processed in this manner, the hashing vectorizer 214 outputs the features in a vector (or some other data structure). Nonzero-valued features in the vector correspond to buckets to which at least one N-gram mapped, while zero-valued functions correspond to buckets to which none of the N-grams mapped. Determining the features for the N-grams in this manner is helpful because it allows previously unseen N-grams to be projected into a finite, predefined feature space.

The one-hot encoder 215 determines additional features for the transaction based on the metadata and the preliminary grouping. For example, suppose a given metadata attribute has k possible values, where k is a non-negative integer. The k possible values correspond to k corresponding features for that particular metadata attribute. For a given transaction, if value for the metadata attribute is the jth value out of the k possible values (where j is also a non-negative integer and $1 \leq j \leq k$), the one-hot encoder 215 sets jth feature to a nonzero value (e.g., a weight) and sets the other k−1 features to zero. The one-hot encoder 215 repeats this process for each metadata attribute and for the preliminary grouping. The one-hot encoder then outputs a vector (or a comparable data structure) with the determined features.

Together, the features determined by the hashing vectorizer 214 and the features determined by the one-hot encoder 215 make up a set of features. The machine learning model 114a receives the set of features as input. Based on the features, the machine learning model 114a predicts a label for the transaction. The machine learning model 114a may be a logistic regression model or some other type of machine learning model. The label is selected from a set of possible categories in a labeling scheme. In some cases, the labeling scheme uses categories defined the tax law of a jurisdiction that has authority to tax the user. For example, if the United States is the jurisdiction, the labeling scheme can include the "schedule C" categories for deductible expenses defined by the Internal Revenue Service (IRS). Prior to predicting the label for the transaction, the machine learning model 114a is trained against the training data 118. The training data 118 includes transaction information and labels for previous transactions.

In some cases, a bypass approach for determining the label can be used. Instead of sending the transaction information and the preliminary grouping to the trainable classifier 112, the API service 108 can compare the preliminary grouping to the mapping 216. The mapping 216 may be an optional construct that directly maps categories defined in the generalized scheme to categories defined in the labeling scheme. The API service 108 determines the label based on the comparison of the preliminary grouping to the mapping 216. The API service 108 can be configured to use this alternative way to assign the label when predefined conditions are met. For example, a predefined condition may be that the mapping 216 has been shown (e.g., by empirical data) to predict the label with better precision or recall than the trainable classifier 112 when the auxiliary preprocessing module 110 assigns a particular preliminary grouping. When such a predefined condition is met, for transactions that are assigned that particular preliminary grouping by the auxiliary preprocessing module 110, the API service 108 can use the mapping 216 to predict the label instead of the trainable classifier 112.

The API service 108 sends a response to the application 116 indicating the label in reply to the API request. When the API response is received, the application 116 may, for example, update an aggregate amount associated with the user and the label (e.g., by adding the amount of the transaction to the aggregate amount). For example, if the aggregate amount is the sum of all deductible expenses for the user in the current calendar year and the transaction is a payment of a licensure fee for the user's profession (classified as a deductible expense under "schedule C"), the application 116 adds the amount of the licensure fee to the sum of deductible expenses.

The application 116 can also solicit input from the user to verify the label was accurately predicted. For example, the application 116 can present the label to the user for inspection and verification (e.g., via the browser 122 in shown in FIG. 1). In one example, the label is presented alongside the transaction information in a pop-up box or another viewing area in a graphical user interface (GUI) with buttons or other graphical elements that allow the user to signal approval or disapproval of the predicted label. In response, the user can indicate the label is correct or indicate the label is incorrect. This aspect of the user input can be referred to as the accuracy indicator.

If the user indicates the label is incorrect, the application 116 presents the user with the set of possible categories in the labeling scheme (e.g., in a drop-down box) and allows the user to indicate a corrected label for the transaction. If the user indicates a corrected label, the application 116 adds the transaction information, labeled with the corrected label, to the training data 118.

Similarly, if the user affirmatively indicates that the label is correct, the transaction information, labeled with the label, may be added to the training data 118. However, in many cases, the user's response upon being presented with the label may be ambiguous (e.g., the user merely closes the pop-up window without indicating whether the label is correct). Also, even if the user indicates the label is correct, contextual data may suggest the user did not review the transaction information and the label closely enough to provide a reliable response (e.g., the user may click on a "correct" button so quickly that it is unlikely the user actually had time to read the transaction information). In such cases, including the transaction information and the label in the training data 118 could introduce improperly labeled training instances that would mislead the trainable classifier 112.

To address this problem, the user input is analyzed to identify at least one reliability indicator. The reliability indicator is compared to one or more reliability conditions to determine whether to add a training instance representing the transaction to the training data 118. One reliability condition can be that the user provides a corrected label. If this condition is satisfied, a training instance representing the transaction can be added to the training data 118. However, if the user does not indicate a corrected label upon being presented with the label, the application 116 can gather contextual data to determine whether the user's conduct implies the label is reliable enough for a training instance to be added to the training data 118. In one embodiment, the application 116 determines the type of device on which the user reviewed the transaction information and the label. If the user reviewed the transaction information on a mobile device (e.g., a smartphone), the application 116 concludes the user most likely did not review the calculation carefully enough for the label to be considered reliable and does not add a training instance representing the transaction to the training data 118. However, if the user reviewed the transaction information on a non-mobile device (e.g., a desktop computer), the application 116 concludes the user most likely did review the calculation carefully enough for the label to be considered reliable and adds a training instance representing the transaction to the training data 118. Hence, the reliability condition that the user reviewed the transaction on the non-mobile device can be applied to transactions for which the user did not indicate a corrected label. Other contextual data can also be used to determine whether the user reviewed the calculation carefully enough, such as the amount of time the user took to review the transaction information (e.g., measured as the difference in timestamps between when the transaction information appeared on a screen at the user's device and when the user clicked on a "correct" button or a "close" button).

The application 116 can also include a user profile 218 for the user. If the user indicates a corrected label for the transaction, the application 116 stores a record of the transaction, including the descriptive string and the corrected label, in the relabeling history 220 for the user. The relabeling history 220 also includes a similar record for each previous transaction the user relabeled. In other words, each record in the relabeling history 220 includes a respective transaction (one or more descriptive strings and other transaction information, in some embodiments) and a respective corrected label.

When the record for the transaction is added to the relabeling history 220, the application 116 compares the descriptive string for the transaction to the respective descriptive strings of the other records in the relabeling history 220 to determine if the user has shown a consistent pattern of relabeling transactions similar to the transaction for which a record was most recently added. More specifically, the application 116 identifies a set of similar transaction records in the relabeling history 220, wherein each record in the set includes a respective descriptive string that meets a threshold similarity level relative to the descriptive string (i.e., the descriptive string for the transaction for which a record was most recently added). The level of similarity between two descriptive strings is measured according to a quantitative metric such as edit distance, Jaro-Winkler distance, or Damerau-Levenshtein distance.

Next, the application 116 compares the cardinality of the set (i.e., the number of transaction records in the set) to a threshold number. If the cardinality meets the threshold number, the application 116 verifies whether a predefined percentage (e.g., 100%) of the transaction records in the set include the same corrected label. If so, the application 116 adds a new override rule for the user to the override rules 222. The new override rule may specify that transactions for the user that have descriptive strings meeting the threshold similarity level relative to the descriptive string are to be labeled with the corrected label by default regardless of what the trainable classifier 112 or the auxiliary preprocessing module 110 would otherwise predict.

In order to ensure that redundant or conflicting rules are not introduced, the application 116 can also perform a series of checks before adding a new rule to the override rules 222. For example, the application 116 can compare the descriptive string (i.e., the descriptive string for the transaction for which a record was most recently added) to the override rules 222 to determine whether any existing rules apply to the transaction. If an existing rule applies to the transaction and the existing rule is consistent with the label the user provided (i.e., the existing rule would label the transaction with the same corrected label provided by the user), the application 116 service refrains from adding a new rule. However, if the existing rule applies to the transaction and is not consistent with the label the user provided, the application 116 can delete the existing rule. Whether a new rule is added to replace the deleted rule depends on whether the predefined percentage of the transaction records in the set will include the same label the user provided after the current transaction is recorded in the relabeling history 220. In some embodiments, a user can review and modify the rules manually via application 116.

In different embodiments, the override rules 222 can be applied at different times when an API request is being processed. In one embodiment, the API service 108 checks whether any of the override rules 222 applies to the transaction before assigning a preliminary grouping. If one of the override rules 222 applies, the API service 108 bypasses the trainable classifier 112 by assigning the label dictated by the rule to the transaction.

Figure 3:
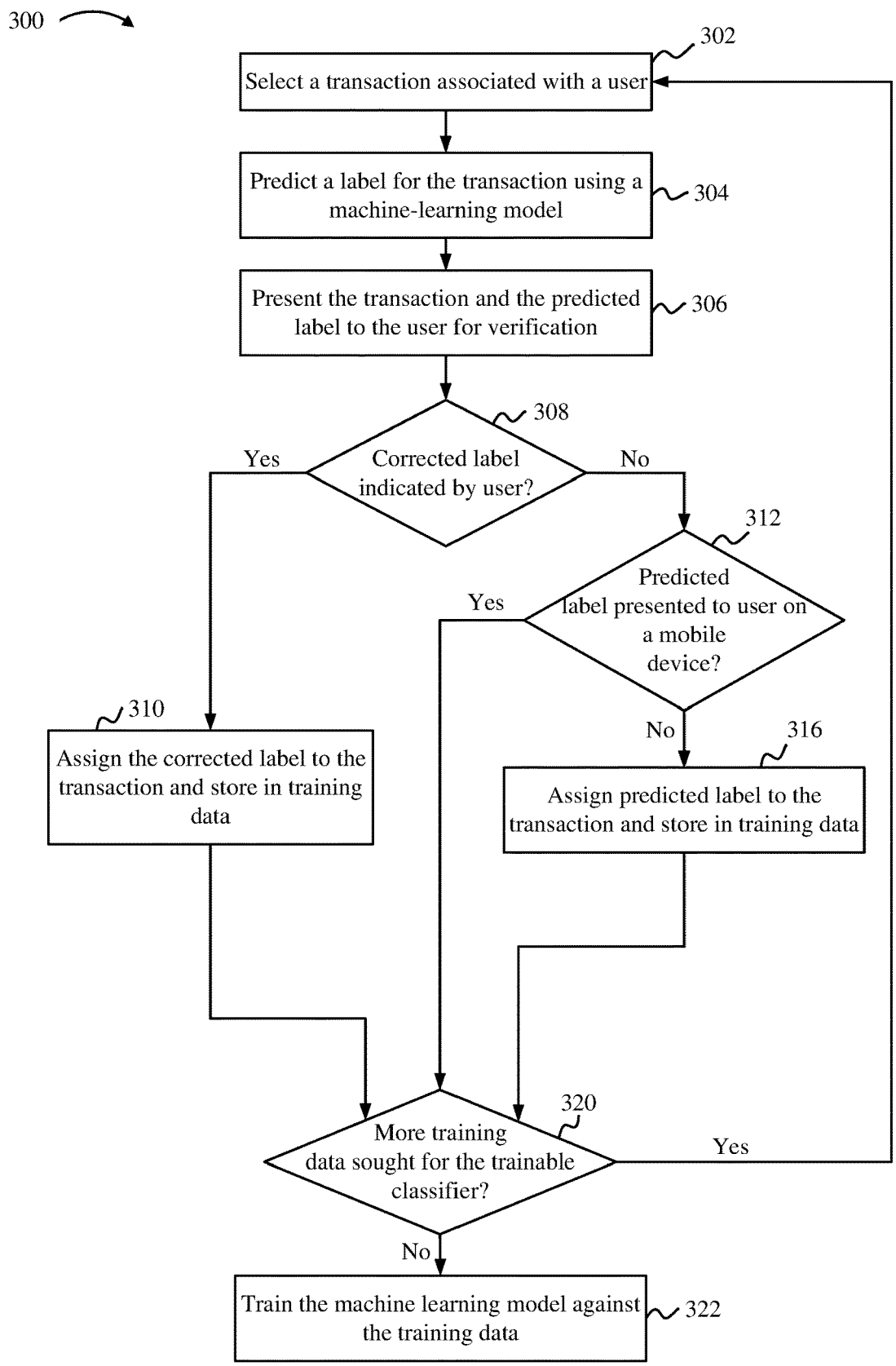
FIG. 3 illustrates a method for updating a machine learning model based on user feedback, according to one embodiment.

FIG. 3 illustrates a method 300 for updating a machine learning model based on user feedback, according to one embodiment. At step 302, a transaction associated with a user is selected. In one example, user input (or some other type of context, such as an account type associated with the user and the transaction) information suggests the transaction represents a deductible expense, taxable income, or some other type of transaction pertinent to tax liability for the user.

At step 304, a label for the transaction is predicted using a machine learning model. In one embodiment, the machine learning model is a logistic regression model that predicts the label based, at least in part, on features derived from a descriptive string for the transaction. In other embodiments, other types of machine learning models may be used.

At step 306, the transaction and the predicted label are presented to the user for verification. In one embodiment, the predicted label and information describing the transaction are presented in a graphical user interface (GUI) with buttons or other graphical elements that allow the user signal approval or disapproval of the predicted label.

At step 308, it is determined whether the user indicated a corrected label (e.g., instead of the predicted label) for the transaction upon being presented with the predicted label. If the user has not indicated a corrected label, the method 300 proceeds to step 312. At step 312, it is determined whether the predicted label was presented to the user on a mobile device (e.g., a smartphone). If so, the method 300 proceeds to step 320. If not, the method 300 proceeds to step 316. At step 316, the transaction is assigned the predicted label and stored in training data for the machine learning model. In one embodiment, step 316 is accomplished by storing the transaction information and metadata together with the predicted label as a training instance.

If the user did indicate a corrected label at step 308, the method 300 proceeds to step 310. At step 310, the transaction is assigned the corrected label and stored in the training data for the machine learning model. In one embodiment, the transaction information and metadata are paired with the corrected label and stored as a training instance in the training data. The descriptive string is assigned with the corrected label and stored in the relabeling history.

At step 320, it is determined whether more training data is sought for the trainable classifier (e.g., before retraining). If so, the method 300 returns to step 302 to select another transaction from which training data may be generated. Otherwise, the method 300 proceeds to step 322. At step 322, the machine learning model is trained against the training data.

Figure 4:
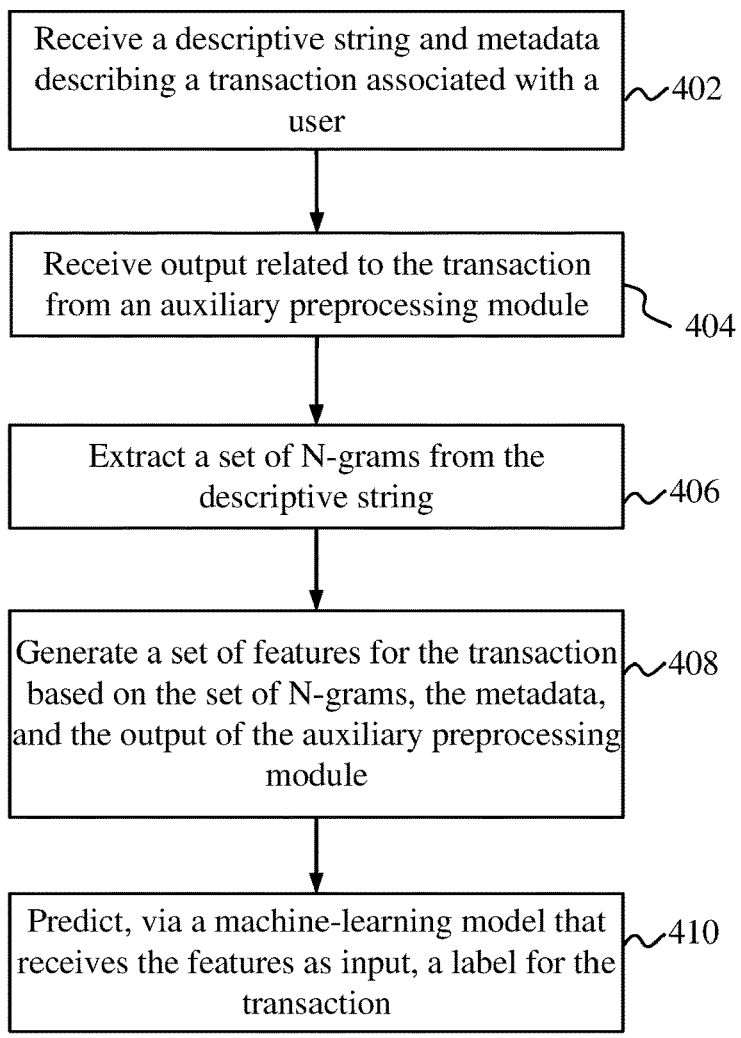
FIG. 4 illustrates a first method whereby an API service with at least one machine learning model can determine a label for a transaction, according to one embodiment.

FIG. 4 illustrates a first method 400 whereby an API service with at least one machine learning model can determine a label for a transaction, according to one embodiment. At step 402, a descriptive string describing a transaction associated with a user is received. In one embodiment, the descriptive string may be accompanied by metadata, such as a Standard Industrial Classification (SIC) and a Merchant Category Code (MCC) associated with the transaction, a geographical region and an industry associated with the user, and an account type (e.g., checking or savings). The name of a merchant with whom the transaction was made may also be included in some embodiments.

At step 404, output related to the transaction is received from an auxiliary preprocessing module. In one embodiment, the output comprises a preliminary grouping that is bound to at least one substring of the descriptive string in an associative array (e.g., a dictionary) of the auxiliary preprocessing module. The associative array includes key-value pairs. A key in the associative array matches the substring; the preliminary grouping is the value that is paired with (i.e., bound to) the matching key. The preliminary grouping is included in a generalized scheme. The output may also include a merchant name.

At step 406, a set of N-grams is extracted from the descriptive string. In one embodiment, only N-grams that have a length less than or equal to three tokens are extracted from the descriptive string. However, in other embodiments, N-grams up to a different length may be extracted. The length can be a hyper-parameter that is tuned during training.

At step 408, a set of features for the transaction is generated. In one embodiment, a hashing vectorizer converts each N-gram into a corresponding feature. In addition, one-hot encoder converts the preliminary grouping and the metadata into corresponding features.

At step 410, a machine learning model that receives the features as input predicts a label for the transaction. The label is included in a labeling scheme that differs from the generalized scheme. In one embodiment, the machine learning model is a multinomial logistic regression model. However, there are many different types of supervised classification models that can be used for the machine learning model. Other examples of supervised classification models include neural networks, naive Bayes, support vector machines, decision trees (e.g., ID3, CART, C4.5), instance-based models (e.g., k-NN), and other ensemble methods (e.g., random forests, gradient-boosting tree, etc.).

Many configurations and parameter combinations may be possible for a given type of machine learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Other parameters that are known in the art, such as momentum, may also be applied to improve neural network performance. In another example, decision trees can be constructed using a variety of approaches. Some non-limiting examples include the Iterative Dichotomiser 3 (ID3), Classification and Regression Tree (CART), and CHi-squared Automatic Interaction Detection (CHAID) methods. These methods may use one or more different metrics to determine the order in which attribute values (e.g., input features) are examined in decision trees. Some non-limiting examples of such metrics include information gain and Gini impurity. In addition, pruning methods may be applied to improve decision tree performance. Some non-limiting examples of pruning techniques include reduced error pruning, cost complexity pruning, and alpha-beta pruning.

Furthermore, individual machine learning models can be combined to form an ensemble machine learning model. An ensemble machine learning model may be homogenous (i.e., using multiple member models of the same type) or non-homogenous (i.e., using multiple member models of different types). Individual machine learning models within an ensemble may all be trained using the same training data or may be trained using overlapping or non-overlapping subsets randomly selected from a larger set of training data.

Figure 5:
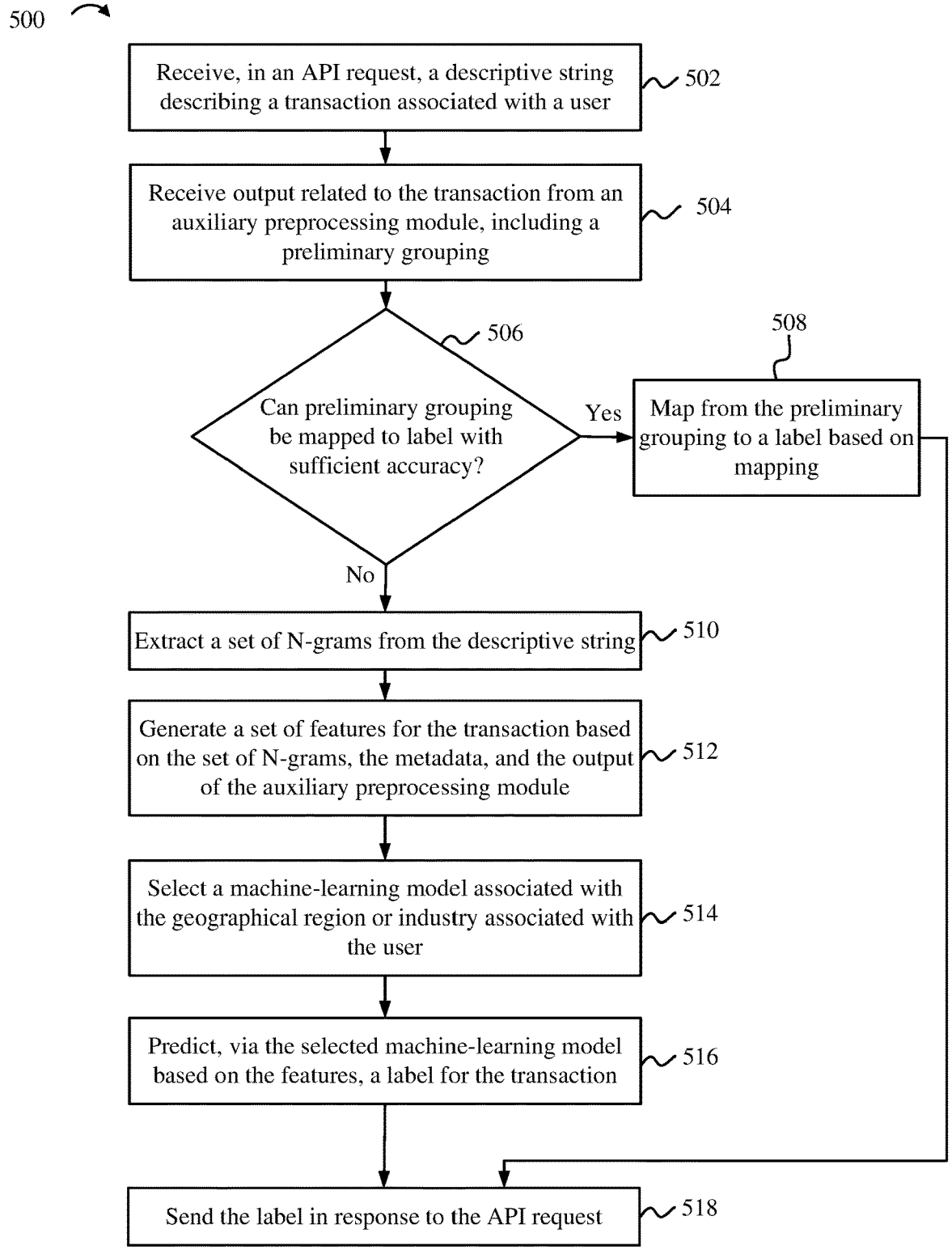
FIG. 5 illustrates a second method whereby an API service with at least one machine learning model can determine a label for a transaction, according to one embodiment.

FIG. 5 illustrates a second method 500 whereby an API service with at least one machine learning model can determine a label for a transaction, according to one embodiment.

At step 502, a descriptive string describing a transaction associated with a user is received in an API request. In one embodiment, the API request also includes metadata, such as a Standard Industrial Classification (SIC) and a Merchant Category Code (MCC) associated with the transaction, a geographical region and an industry associated with the user, and an account type.

At step 504, output related to the transaction is received from an auxiliary preprocessing module. In one embodiment, the output comprises a preliminary grouping that is bound to at least one substring of the descriptive string in an associative array (e.g., a dictionary) of the auxiliary preprocessing module. The associative array includes key-value pairs. A key in the associative array matches the substring; the preliminary grouping is the value that is paired with (i.e., bound to) the matching key. The preliminary grouping is included in a generalized scheme. The output may also include a merchant name.

At step 506, it is determined whether an existing mapping can determine a label from a labeling scheme based on the preliminary grouping with an acceptable level of accuracy. In one embodiment, the accuracy is deemed sufficient if statistical analysis of training data demonstrates that transactions assigned the preliminary grouping can be mapped to a label at a threshold level of precision or recall. If the preliminary grouping can be mapped to the label with sufficient accuracy, the method 500 proceeds to step 508. Otherwise, the method 500 proceeds to step 510.

At step 508, a label from a labeling scheme (that differs from the generalized scheme) is mapped by comparing the preliminary grouping to a mapping. If step 508 is executed, the method 500 bypasses steps 510-522 and proceeds to step 524.

At step 510, a set of N-grams is extracted from the descriptive string. In one embodiment, only N-grams that have a length less than or equal to three tokens are extracted from the descriptive string. In other embodiments, N-grams up to a different token length may be extracted.

At step 512, a set of features for the transaction is generated. In one embodiment, a hashing vectorizer converts each N-gram into a corresponding feature. In addition, one-hot encoder converts the preliminary grouping and the metadata into corresponding features.

At step 514, a machine learning model is selected from a set of available machine learning models. Each of the machine learning models in the set has been trained using training data associated with a particular respective geographical region or a particular industry. In one embodiment, the selected machine learning model has been trained using training data associated with the geographical region or industry that was specified in the API request.

At step 516, the selected machine learning model receives the features as input and predicts a label for the transaction. The label is included in a labeling scheme that differs from the generalized scheme. In one embodiment, the machine learning model is a multinomial logistic regression model. However, as explained above with respect to FIG. 4, there are many different types of supervised classification models that can be used for the machine learning model.

At step 518, the label is sent in response to the API request.

Figure 6:
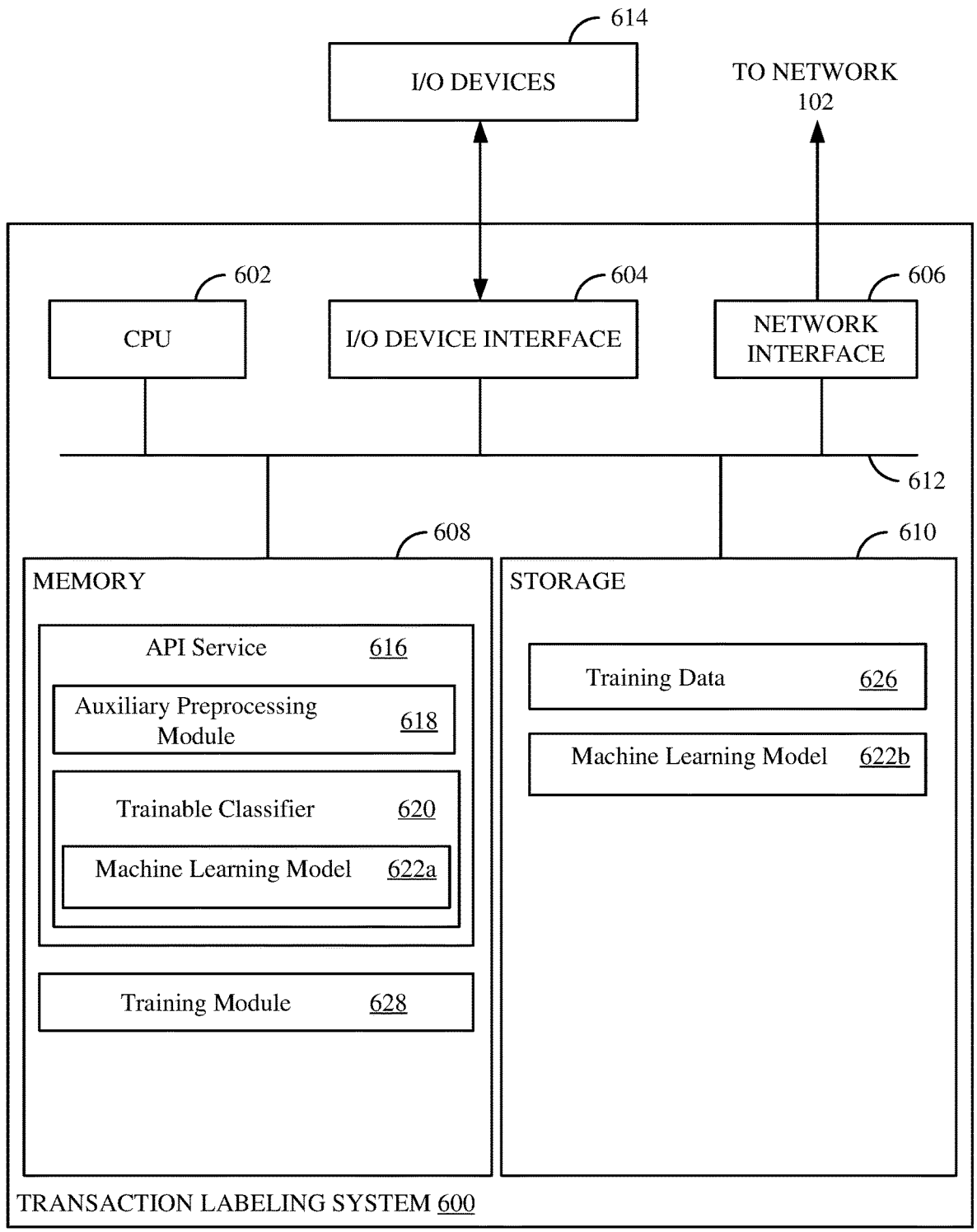
FIG. 6 illustrates a transaction labeling system 600 that predicts labels for transactions, according to an embodiment.

FIG. 6 illustrates a transaction labeling system 600 that predicts labels for transactions, according to an embodiment. As shown, the transaction labeling system 600 includes, without limitation, a central processing unit (CPU) 602, at least one I/O device interface 604 which may allow for the connection of various I/O devices 614 (e.g., keyboards, displays, mouse devices, pen input, etc.) to the transaction labeling system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed or removable storage devices, such as fixed disc drives, removable memory cards or optical storage, network attached storage (NAS), or a storage area-network (SAN).

As shown, memory 608 includes an API service 616, an auxiliary preprocessing module 618, a trainable classifier 620, a training module 628, and a machine learning model 622a. As shown, storage 610 includes training data 626 and a machine learning model 622b. The training data 626 includes transaction information, metadata, and labels (with correctness verified by users or through accuracy and reliability indicators) from previous transactions.

The training module 628 trains the machine learning model 622b against the training data 626. After a training session is complete, the training module 628 copies the machine learning model 622b into the trainable classifier 620. Machine learning model 622a is the copy that resides in the trainable classifier 620.

When the API service 616 receives a descriptive string for a transaction to be labeled in an API request, the auxiliary preprocessing module 618 determines if at least one token in the descriptive string matches a key for an entry in an associative array. If a matching entry is found, the auxiliary preprocessing module 618 assigns a preliminary grouping that is bound to the matching key in the associative array to the transaction. The preliminary grouping is selected from a set of possible groupings in a generalized scheme. In some embodiments, the auxiliary preprocessing module 618 also determines a merchant name associated with the transaction.

The trainable classifier 620 extracts a plurality of N-grams from the descriptive string. The trainable classifier 620 determines a set of features for the transaction based on the plurality of N-grams and the preliminary grouping. The machine learning model 622a receives the features as input and predicts a label for the transaction. The label is selected from a set of possible labels in a labeling scheme. The API service 616 sends the label in response to the API request.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving an electronic request to label a transaction comprising a transaction amount and a descriptive string associated with the transaction;
   generating a set of features associated with the descriptive string, wherein generating the set of features comprises identifying a preliminary grouping for the transaction based on a substring of the descriptive string;
   determining, via a machine learning model, a label for the transaction based on the set of features, wherein the set of features comprises the preliminary grouping for the transaction;
   providing the label in response to the electronic request;
   receiving user input comprising a reliability indicator related to the label;
   adding a training instance representing the transaction to a set of training data for the machine learning model based on the reliability indicator satisfying a reliability condition, wherein the machine learning model is retrained based on the training data instance; and
   updating an aggregate value associated with the label based on the transaction amount.

2. The method of claim 1, wherein the preliminary grouping is bound to the substring of the descriptive string in an associative array.

3. The method of claim 2, wherein generating the set of features for the transaction comprises:
   applying a hashing vectorizer to a set of N-grams extracted from the descriptive string; and
   applying a one-hot encoder to the preliminary grouping.

4. The method of claim 3, wherein each N-gram in the set of N-grams has a length less than or equal to three tokens.

5. The method of claim 1, wherein adding a training instance representing the transaction to a set of training data for the machine learning model based on the reliability indicator satisfying the reliability condition comprises evaluating an amount of time a user took to review information related to the transaction.

6. The method of claim 1, wherein adding the training instance representing the transaction to the set of training data for the machine learning model based on the reliability indicator satisfying the reliability condition comprises determining that a user providing the user input reviewed the label on a non-mobile device.

7. The method of claim 1, further comprising:
   identifying a geographical region or industry associated with the user input; and
   selecting the machine learning model from a set of available machine learning models based on the geographical region or industry.

8. The method of claim 1, further comprising:
   receiving user input indicating a corrected label for the transaction;
   storing the descriptive string in a transaction record labeled with the corrected label in a relabeling history associated with a user that provided the user input indicating the corrected label;
   identifying a set of similar transaction records in the relabeling history, wherein each respective record in the set of similar transaction records includes a respective descriptive string that meets a threshold similarity level relative to the descriptive string;

determining the set of similar transaction records has a cardinality that meets a threshold number; and generating an override rule for the user, wherein the override rule specifies that the corrected label be assigned to transactions that meet the threshold similarity level relative to the descriptive string.

9. The method of claim 8, wherein receiving user input indicating a corrected label for the transaction comprises:

displaying a plurality of categories; and receiving a user selection of a category of the plurality of categories, wherein the corrected label is associated with the category.

10. The method of claim 1, further comprising:

displaying the label and information describing the transaction to a user in a graphical user interface; and receiving user input via the graphical user interface.

11. A system, comprising:

one or more processors; and memory storing one or more instructions that, when executed on the one or more processors, perform a method comprising:

receiving an electronic request to label a transaction comprising a transaction amount and a descriptive string associated with the transaction;

generating a set of features associated with the descriptive string, wherein generating the set of features comprises identifying a preliminary grouping for the transaction based on a substring of the descriptive string;

determining, via a machine learning model, a label for the transaction based on the set of features, herein the set of features comprises the preliminary grouping for the transaction;

providing the label in response to the electronic request;

receiving user input comprising a reliability indicator related to the label;

adding a training instance representing the transaction to a set of training data for the machine learning model based on the reliability indicator satisfying a reliability condition, wherein the machine learning model is re-trained based on the training data instance; and updating an aggregate value associated with the label based on the transaction amount.

12. The system of claim 11, wherein the preliminary grouping is bound to the substring of the descriptive string in an associative array.

13. The system of claim 12, wherein generating the set of features for the transaction comprises:

applying a hashing vectorizer to a set of N-grams extracted from the descriptive string; and applying a one-hot encoder to the preliminary grouping.

14. The system of claim 13, wherein each N-gram in the set of N-grams has a length less than or equal to three tokens.

15. The system of claim 11, wherein adding a training instance representing the transaction to a set of training data for the machine learning model based on the reliability indicator satisfying the reliability condition comprises evaluating an amount of time a user took to review information related to the transaction.

16. The system of claim 11, wherein adding the training instance representing the transaction to the set of training data for the machine learning model based on the reliability indicator satisfying the reliability condition comprises determining that a user providing the user input reviewed the label on a non-mobile device.

17. The system of claim 11, wherein the method further comprises:

identifying a geographical region or industry associated with the user input; and selecting the machine learning model from a set of available machine learning models based on the geographical region or industry.

18. The system of claim 11, wherein the method further comprises:

receiving user input indicating a corrected label for the transaction;

storing the descriptive string in a transaction record labeled with the corrected label in a relabeling history associated with a user that provided the user input indicating the corrected label;

identifying a set of similar transaction records in the relabeling history, wherein each respective record in the set of similar transaction records includes a respective descriptive string that meets a threshold similarity level relative to the descriptive string;

determining the set of similar transaction records has a cardinality that meets a threshold number; and generating an override rule for the user, wherein the override rule specifies that the corrected label be assigned to transactions that meet the threshold similarity level relative to the descriptive string.

19. The system of claim 18, wherein receiving user input indicating a corrected label for the transaction comprises:

displaying a plurality of categories; and receiving a user selection of a category of the plurality of categories, wherein the corrected label is associated with the category.

20. A method, comprising:

receiving an electronic request to label a transaction comprising a transaction amount and a descriptive string associated with the transaction;

identifying a preliminary grouping that is bound to at least one substring of the descriptive string in an associative array;

determining via a machine learning model, a label for the transaction based on a set of features, wherein the set of features comprises the preliminary grouping;

providing the label in response to the electronic request;

receiving user input comprising a reliability indicator related to the label;

adding a training instance representing the transaction to a set of training data for the machine learning model based on the reliability indicator satisfying a reliability condition, wherein the machine learning model is re-trained based on the training data instance; and updating an aggregate value associated with the label based on the transaction amount.

* * * * *